United States Patent [11] 3,633,186

[72] Inventors John J. Lynott
Los Gatos;
Robert C. Treseder, San Jose, both of Calif.

[21] Appl. No. 51,831
[22] Filed July 2, 1970
[45] Patented Jan. 4, 1972
[73] Assignee International Business Machines Corporation
Armonk, N.Y.

[54] TRANSDUCER ACCESSING MECHANISM UTILIZING CENTRIFUGAL FORCE

7 Claims, 1 Drawing Fig.

[52] U.S. Cl. .................... 340/174.1 C, 179/100.2 CA, 346/74 MD
[51] Int. Cl. .................... G11b 5/56, G11b 21/08
[50] Field of Search .................... 340/174.1 C, 174.1 F; 179/100.2 CA; 346/74 MD

[56] References Cited

UNITED STATES PATENTS

| | | | |
|---|---|---|---|
| 3,196,422 | 7/1965 | Cheney | 340/174.1 C |
| 3,484,760 | 12/1969 | Perkins et al. | 179/100.2 CA |

FOREIGN PATENTS

| | | | |
|---|---|---|---|
| 1,004,492 | 9/1965 | Great Britain | 340/174.1 C |

*Primary Examiner*—Stanley M. Urynowicz, Jr.
*Assistant Examiner*—Vincent P. Canney
*Attorneys*—Hanifin and Jancin and Shelley M. Beckstrand

ABSTRACT: A servomechanism for rotating a magnetic head and accessing it from track to track. A rotating head is caused to scan one of a plurality of concentric tracks on a stationary disk. The net centrifugal force of the head and a larger counterweight mass is used to move the head from track to track and to adjust the rotational velocity to achieve a constant linear bit density.

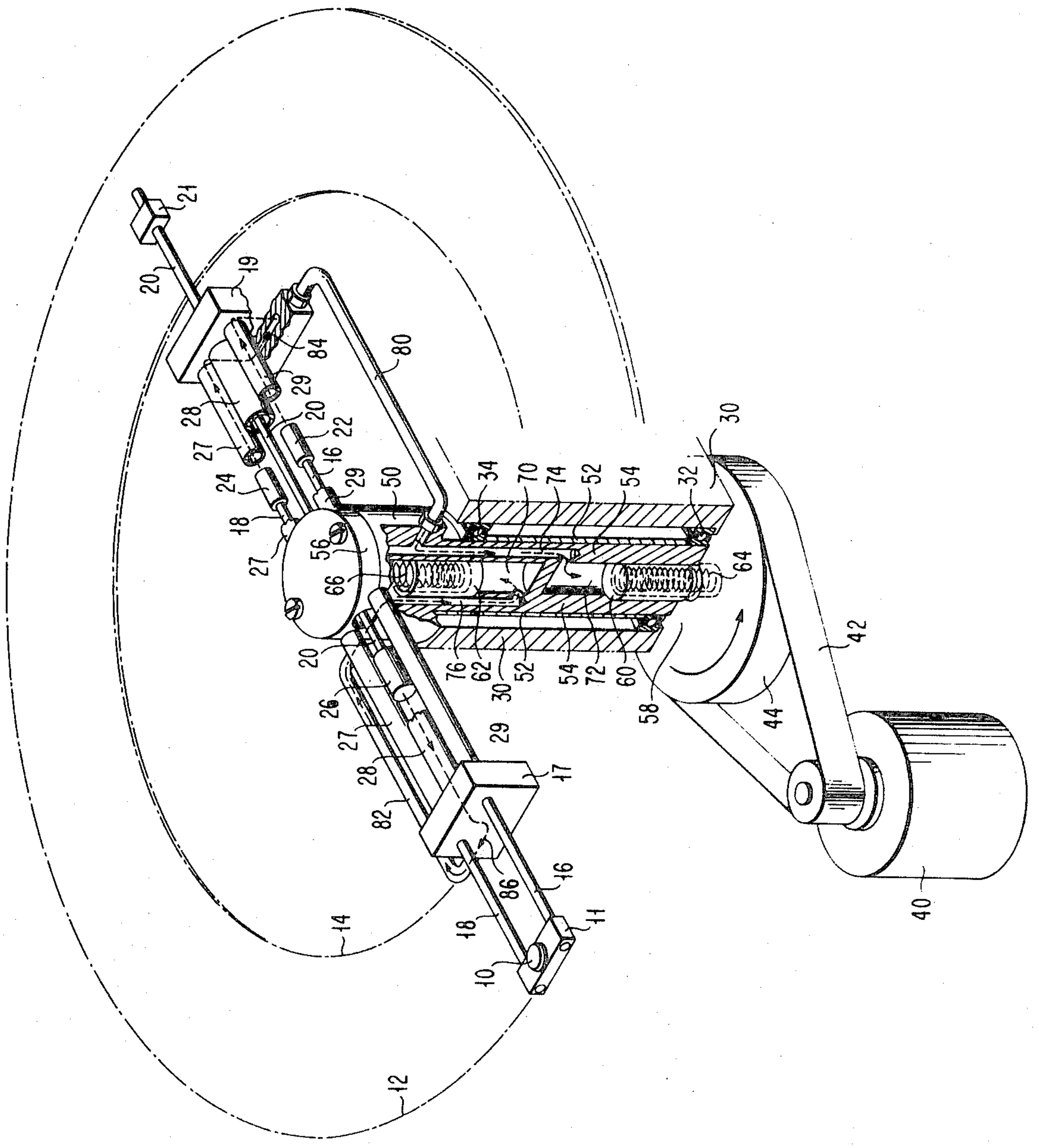
*INVENTORS.*
JOHN J. LYNOTT
ROBERT C. TRESEDER
*BY* Shelley M. Beckstrand
ATTORNEY

TRANSDUCER ACCESSING MECHANISM UTILIZING CENTRIFUGAL FORCE

BACKGROUND OF THE INVENTION

1. Field of the Invention

The invention relates to the storage and readout of information from a magnetic element requiring relative movement between the magnetic element and the transducer in which a voltage indicative of the state of the magnetic element is induced.

2. Description of the Prior Art

U.S. Pat. No. 3,144,642 by R. C. Treseder describes a random access file with stationery records. In the apparatus of the Treseder patent, a rotor 23 is driven at a constant angular velocity. Mounted within said rotor are transducer 39 and 40. Also mounted within rotor 23 are radial adjustment piston adder 42. Thus, the above Treseder patent describes an apparatus for rotating a magnetic transducer so as to scan a magnetic track on a stationery recording surface. However, this arrangement requires a relatively complicated accessing mechanism which must rotate with the tranducers, adding significantly to the power requirements and the inertia of the system.

Known in the prior art are systems where a relatively constant recording density is achieved by electronically varying the recording frequency from track to track. The significant problem with this approach is the complexity that is adds to the track addressing, requiring a variable number of sectors on the data tracks.

SUMMARY OF THE INVENTION

It is therefore an object of the invention to provide a memory device having rapid random access to any storage location.

Another object of this invention is to provide a magnetic memory device utilizing a plurality of coaxial magnetic tracks wherein a single magnetic transducer may coact with more than one track. It is a further object of the invention to provide an improved accessing mechanism for positioning a magnetic transducer to one of a plurality of coaxial magnetic data tracks.

It is a further object of the invention to provide an accessing arrangement utilizing centrifugal force for accessing a magnetic transducer from track to track.

It is a further object of the invention to provide an accessing mechanism with variable rotational velocity, such that an essentially constant linear bit density is achieved.

It is a further object of the invention to achieve the above without requiring the rotation of a complicated accessing mechanism together with the transducer.

In summary, the apparatus of the invention for achieving the above objects comprises a stationary disk having concentric data tracks. A magnetic transducer is mounted to a rotating capstan, which capstan is driven at a controlled variable speed by a motor. Said transducer is mounted to said capstan in such a manner that differences in rotational velocity are translated into the centrifugal force required for positioning said head to different concentric tracks.

The foregoing and other objects, features and advantages of the invention will be apparent from the following more particular description of a preferred embodiment of the invention, as illustrated in the accompanying drawings.

BRIEF DESCRIPTION OF THE DRAWINGS

The FIGURE is a partially cut diagrammatic view of the rotating and accessing mechanism of the invention.

DESCRIPTION

Referring now to the drawing, a more detailed description will be given of the head rotating and accessing mechanism of the invention.

Magnetic transducer or head 10 is mounted on headblock 11 and adapted for rotation in a circular path between the outside diameter 12 and inside diameter 14 of a magnetic recording surface. Headblock 11 is mounted to head piston rods 16 and 18, which rods are free to move axially within head end cap 17. Counterbalance 21 is mounted to counterbalance piston rods 20, which is mounted for coaxial movement through counterbalance end cap 19. Counterweight pistons 22 and 24 are mounted to the ends of piston rods 16 and 18 respectively. Counterbalance piston 26 is mounted to the end of counterbalance piston rod 20. Head piston rod 18 and counterweight piston 24 are mounted within head cylinder 27. Head piston rod 16 and the attached counterweight piston 22 are mounted within head cylinder 29. Cylinders 27, 28, and 29 attached to capstan 50 by capstan head 56. End caps 17 and 19 are attached to the ends of cylinders 27–29.

Counterbalance piston rod 20 and its associated piston 26 are mounted within counterbalance cylinder 28 for axial movement.

With variations in fluid pressure in head cylinders 28 and 29, counterweight pistons 22 and 24 move within said cylinders, driving head piston rods 16 and 18 causing head 10 to move to various track locations, which track being a function of the fluid pressure within the cylinders 27 and 29. Similarly, variations of pressure within cylinder 28 drives piston 26 and its associated piston rod 20 so as to move counterbalance 21 to various radial track locations. Counterbalance 21 serves to provide rotational stability to the system, eliminating or reducing vibration. It does not serve to function in the illustrated embodiment, however, in determining the track followed by head 10.

Capstan assembly 50 is mounted between lower bearing 32 and upper bearing 34 for rotation within bearing frame 30. Said capstan 50 comprises an inner race spacer 52, a capstan body 54, capstan head 56, and a pulley bearing retainer 58. Inner race spacer 52 separates and spaces bearings 32 and 34, while capstan body 54 is contained between pulley bearing retainer 58 and capstan head 56.

Variable-speed motor 40 is attached by belt 42 to the drive spindle pulley 44 on pulley-bearing retainer 58. Motor 40 may be a variable-frequency AC motor or a variable-voltage DC motor which may be controlled to apply varying velocity to head 10 and to control its track position, as will be more fully described hereinafter.

The force means provided for balancing the net centrifugal force of the head and counterweight assemblies to establish the track location for head 10 will next be described.

The net centrifugal force $F_c$ is expressed as follows:

$$F_c \approx (M_1 r_1 - M_2 r_2)\omega^2$$

where $M_1$ = mass of counterweight pistons 22 and 24
$M_2$ = mass of head assembly 10, 11
$r_1$ = radius of rotation of $M_1$
$r_2$ = radius of rotation of $M_2$
$\omega$ = angular velocity (assuming the mass of rods 16 and 18 to be negligible). Contained within capstan 50 is counterweight reference cylinder 72. Mounted within counterweight reference cylinder 72 is counterweight reference piston 60, which piston 60 is hollowed out to receive the force means or counterweight reference spring 64. Said reference spring 64 may be nonlinear and is compressed between the inside surface of counterweight reference piston 60 and the top of the pulley-bearing retainer 58, thus tending to force said counterweight reference piston 60 upwards as shown in the figure, whereas pressure within counterweight reference cylinder 72 tends to force said piston 60 downwards as shown in the FIGURE.

The nonlinearity of force means or spring 64, in order to achieve an essentially constant linear velocity for head 10 irrespective of the data track radius, may be expressed as follows:

$$F_s = kd,$$

where $$K = f(d),$$

such that $$F_s = f(d^2)$$

where
$F_5$ = force exerted by spring 64 against piston 60
$K$ = spring "contant"
$d$ = distance spring 64 is compressed Also contained within capstan body 54 is counterbalance reference cylinder 70. Mounted within counterbalance reference cylinder 70 is counterbalance reference piston 62, which is adapted for movement along the axis of capstan 50 within said counterbalance reference cylinder 70. Counterbalance reference piston 62 has a hollow portion into which counterbalance reference spring 66 fits. Said spring 66 may be a nonlinear spring providing a variable force with variations in compression. Said spring 66 is compressed between the bottom position of capstan head 56 and the inside surface of counterbalance reference piston 62. Thus, the spring tends to force counterbalance piston 62 downward as shown in the FIGURE, whereas pressure within counterbalance reference cylinder 70 tends to push said counterbalance upwards as shown in the FIGURE and as will be more fully described hereinafter.

Counterbalance reference cylinder 70 is hydraulically connected to counterbalance cylinder 28 through port 76, connecting tube 82, and manifold 86. Counterweight reference cylinder 72 is hydraulically connected to counterweight cylinders 27 and 29 through manifold 84, connecting tube 80, and port 74.

The major forces acting on the hydraulic fluid in counterbalance reference cylinder 20 and counterbalance cylinder 28 are the force of spring 66 against counterbalance reference piston 62 and the centrifugal forces of counterbalance 21, counterbalance piston rod 20, and counterbalance piston 26. Similarly, the forces acting on the hydraulic fluid in counterweight reference cylinder 72 and counterweight cylinders 27 and 29 are the force of spring 64 against counterweight piston 60, and the centrifugal forces established in recording head 10, headblock 11, head piston rod 16 and 18, and counterweight pistons 22 and 24.

The manner in which centrifugal force is used to position head 10 to the desired data track will next be described. Referring to the drawing, the sum of the weight of counterweight pistons 22 and 24 is significantly greater than that of head 10 and headblock 11. Thus, with a high angular velocity, counterweight pistons 22 and 24 tend to move to a larger radius, thus drawing the head 10 in towards a narrow radius. The result of this is that the linear velocity of head 10 on an outside track is essentially the same as the linear velocity of head 10 on an inside track, when allowances are made for the nonlinearity of spring 64.

The centrifugal forces tending to move counterweight pistons 22 and 24 to a wider track with rotation of head assembly, is offset by force means or spring 64 acting against piston 60. The hydraulic system previously described is used to couple the forces of spring 64 to the pistons 22 and 24. The hydraulic system disclosed has the advantage of being able to turn corners without friction and results in a saving in space. Other arrangements will be apparent to those skilled in the art; for example, the hydraulic system could be replaced by a system of steel bands and rollers which would couple the counterweight pistons 22 and 24 to a spring arrangement similar to that shown at 64.

Pistons 60 and 62 are placed on the axis of rotation of the capstan assembly 50 in order to minimize centrifugally induced friction in said pistons. The purpose of counterbalance 21 and counterbalance piston 26 is to offset the centrifugal force on block 11 and counterweights 22 and 24, in order to eliminate vibration of the entire assembly. It should be noted that block 11 and counterweight 21 move as mirror images, that is, both moving in the same direction with respect to the axis of rotation.

It is desirable for best operation (i.e., minimum vibration) that both spring 64 and spring 66 be nonlinear by the same amount. This requirement could be somewhat lessened by mechanically linking the pistons 62 and 60, provided they were arranged to move in the same direction. As is shown in the FIGURE, the said pistons 62 and 60 move in opposite directions but obviously the assembly could be arranged so that they move together, permitting a mechanical linkage between them. As shown in the drawing, the area of piston 60 is equal to the sum of the areas of pistons 20 and 24, and the area of piston 62 is equal to the area of piston 26. With this arrangement, piston 60 moves the same distance as does head 10. By varying the ratio of the areas of the pistons, the head 10 can be made to move a greater or lesser amount than pistons 60.

With zero centrifugal force, that is, with the entire assembly stationary, and assuming a frictionless system, head 10 and counterbalance 21 would be positioned at the outermost track. With the assembly rotating, the head 10 tends to move towards the inner track, until a balance is achieved with respect to the spring forces and the centrifugal forces in the rotating capstan system.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. An apparatus for rotating a magnetic transducer about an axis and for positioning said transducer in cooperative relationship with a selected one of a plurality of concentric circular recording tracks of a stationary magnetic surface, comprising:
   - counterweight means coupled to said transducer and responsive to changes in angular velocity of said transducer for varying the radius of rotation of said transducer, and force means coupled to said counterweight means for balancing the net centrifugal force of said counterweight means and said transducer, whereby for a given angular rotation, said transducer will be positioned over a selected recording track.

2. The apparatus of claim 1 wherein the centrifugal force of said counterweight means is greater than the centrifugal force of said transducer means, so that said transducer is positioned at an inner track for a high velocity and at an outer track for a low angular velocity.

3. A rotating and positioning apparatus, comprising:
   - a rotatable capstan mounted for rotation about an axis,
   - motor means for driving said capstan at a variable angular velocity,
   - stationary magnetic surface means having a plurality of data tracks concentric to said axis,
   - transducer means mounted to said capstan for rotation about said axis in cooperative relationship with one of said plurality of concentric data tracks,
   - counterweight means mechanically coupled to said transducer and also mounted for rotation with said capstan, said transducer means and said counterweight means being radially moveable within a plane perpendicular to said axis,
   - force means mounted within said capstan and coupled to said counterweight means for balancing the net centrifugal force of said counterweight means and said transducer means,
   - whereby said transducer is positioned over the selected data track in accordance with the angular velocity of said capstan.

4. The apparatus of claim 3 wherein the centrifugal force of said counterweight means is greater than the centrifugal force of said transducer means, so that said transducer means is positioned at an outside track for a low angular velocity and at an inside track for a high angular velocity.

5. The apparatus of claim 4 further including counterbalance means for achieving rotational stability and eliminating vibration.

6. The apparatus of claim 4 wherein said counterweight means comprises piston means, and wherein said counterweight means and said transducer are mechanically coupled by piston rod means.

7. The apparatus of claim 3 wherein said force means comprises a variable-force spring acting on a counterweight reference piston which is hydraulically coupled with said counterweight means.

* * * * *